United States Patent

Stone

[15] 3,648,386

[45] Mar. 14, 1972

[54] VISUAL TRAINING MACHINE

[72] Inventor: Beverly I. Stone, 2525 Grand Summit Road, Torrance, Calif. 90505

[22] Filed: Aug. 4, 1969

[21] Appl. No.: 847,074

[52] U.S. Cl. ..........................................35/8 R, 35/73, 46/32
[51] Int. Cl. ......................................................G09b 1/06
[58] Field of Search..................35/8 R, 19 R, 22, 28, 34, 60, 35/73; 40/128; 46/32; 248/48, 44; 273/58 C; 58/129; 43/27.4

[56] References Cited

UNITED STATES PATENTS

| | | | |
|---|---|---|---|
| 3,417,502 | 12/1968 | Thomas | 43/27.4 |
| 115,349 | 5/1871 | Palm | 35/60 |
| 414,371 | 11/1889 | Boss | 35/60 X |
| 546,333 | 9/1895 | Kell | 46/32 X |
| 702,910 | 6/1902 | Austin | 273/58 C X |
| 1,481,075 | 1/1924 | Strouse | 35/19 R |
| 2,474,447 | 6/1949 | Wheelock | 35/73 |
| 2,592,078 | 4/1952 | Taylor | 35/73 X |
| 2,671,624 | 3/1954 | Carney | 40/145 X |
| 3,014,307 | 12/1961 | Dupuis | 46/32 X |
| 3,030,718 | 4/1962 | Kirkman | 40/128 |
| 3,478,446 | 11/1969 | McCutcheon | 35/60 X |

FOREIGN PATENTS OR APPLICATIONS

| | | | |
|---|---|---|---|
| 497,087 | 8/1919 | France | 40/128 |

OTHER PUBLICATIONS

The Book of Trix Models, Book 1, Anfoe Co., England Rec'd. Nov. 1932, " Rotary Crane" of page 47.
Knott Apparatus Co. Catalog Rec'd. Jan. 1917, pp. 104, 123 only.

*Primary Examiner*—Harland S. Skogquist
*Attorney*—Robert Thompson

[57] ABSTRACT

A visual training machine including a base having a support member secured thereto, the support member having an upright portion with a laterally projecting arm extending horizontally therefrom. A pivot point aperture which is formed in the arm receives a fine line. An object to be identified and observed is connected to one end of the line extending downward from the pivot point and can be raised, lowered, swung back and forth, spiral motion and/or rotated. The other end of the line includes a looped portion thereof which can be connected to any one of various adjustment hooks or which can be held in the operator's hand. Positioned behind the machine can be placed a backdrop of complementing or contrasting configuration relative to the object. In addition a display board having a plurality of different objects, only one of which is identical to the suspended object can be utilized by the observer.

1 Claim, 4 Drawing Figures

PATENTED MAR 14 1972 3,648,386
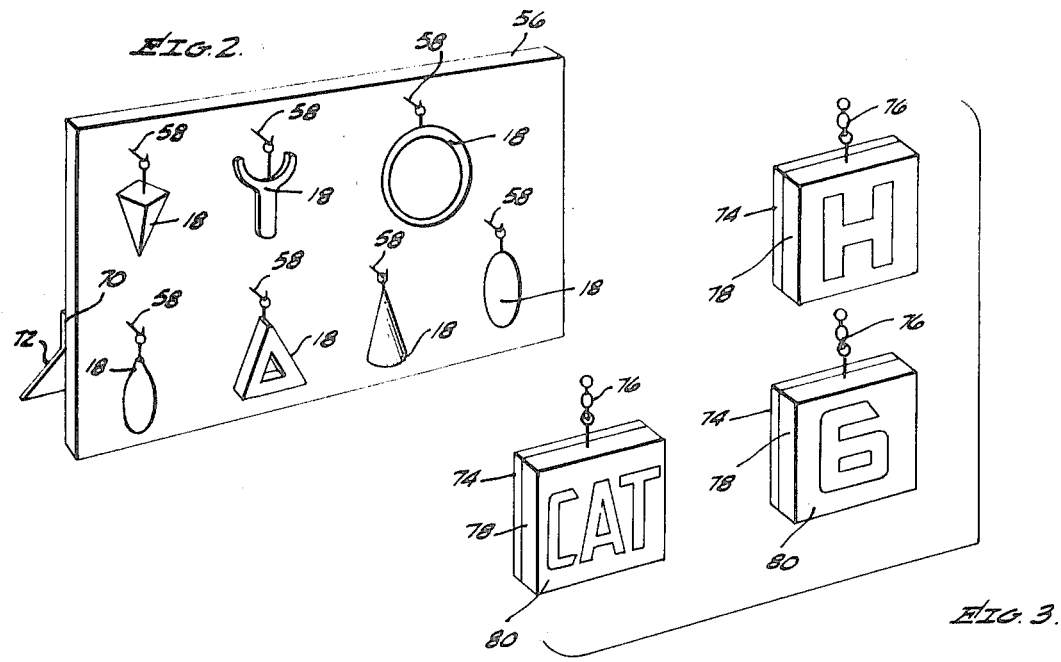
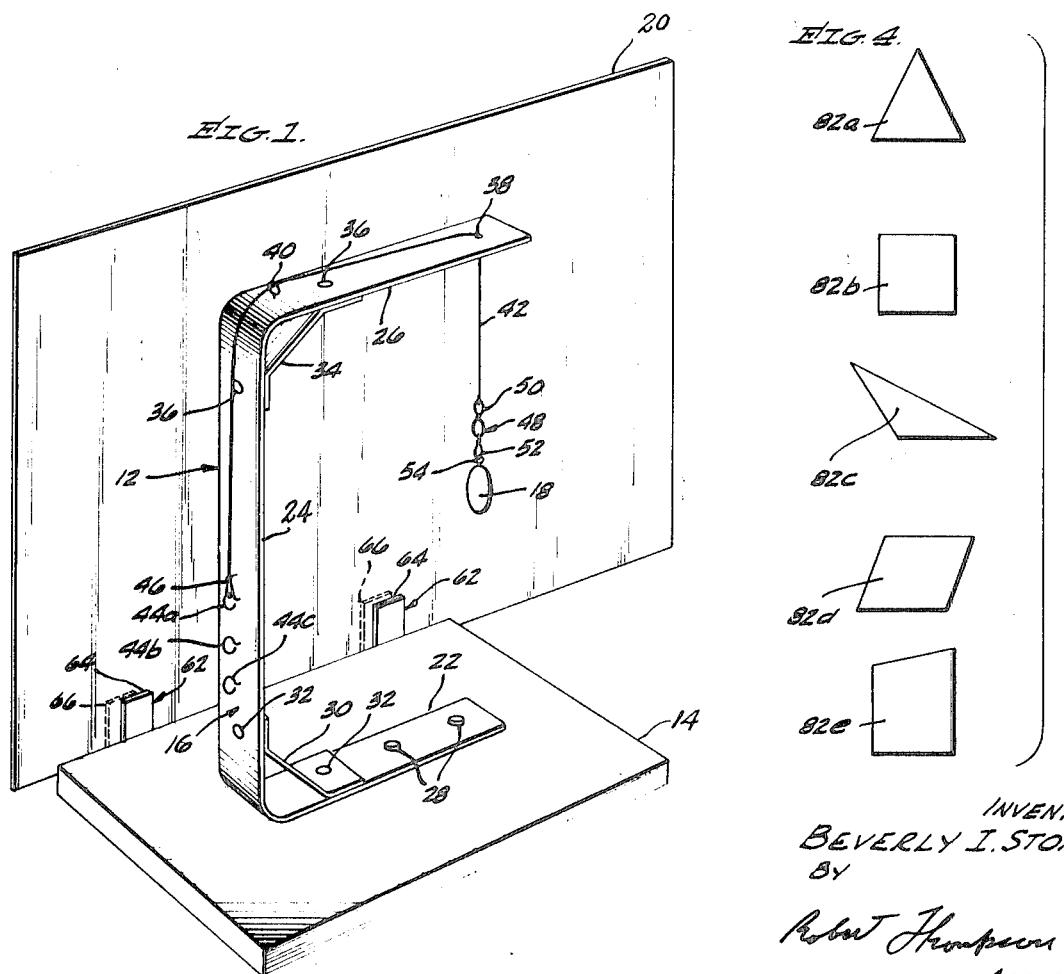
INVENTOR.
BEVERLY I. STONE,
BY
Robert Thompson
ATTORNEY.

VISUAL TRAINING MACHINE

BACKGROUND OF THE INVENTION

This invention relates to visual training devices of a type that can be used to correct visual problems.

Some persons have abnormal visual problems which can be corrected through therapy. Some of these problems include: visual track-problems where an individual is unable to identify or even follow a moving object; field of view problems where a person cannot distinguish objects peripheral to his field of view; visual motor coordination problems where the viewer's hand is not coordinated with his visual senses; and three-dimensional figure ground problems where an individual is unable to pick out designated objects from background or surrounding objects.

SUMMARY OF THE INVENTION

An object of this invention is to provide an improved visual training machine which can be utilized to correct or diminish any of the above stated problems.

Other objects of this invention can be attained with a training device in which unique objects can be effectively suspended in space in the viewer's field of view by means of a fine line which is pivotally suspended from a laterally projecting arm on an upright support member. Any one of a plurality of unique three-dimensional objects or two-dimensional objects including words, letters, numbers, or geometric shapes can be suspended in space and swung to or fro, rotated, and/or raised or lowered, all in the viewer's field of view. The viewer then can correlate the suspended object with objects on a display board, only one of which is identical to the suspended object, he can orally identify it, or else he can draw it. In addition, a backdrop which can have a surface which is complementary of or contrasting relative to the suspended object is operable to be placed behind the object in the viewer's field of view. An advantage of this device is that by raising and lowering the object the frequency of its periodic motion is increased or decreased accordingly. Another advantage of the machine is that acuity of peripheral vision can be developed by placing the suspended object lateral of the viewer's line of sight. Still another advantage is that visual-motor coordination is developed by requiring the viewer to grasp the object at a given signal or point. Yet another advantage is that the operator has control of the object and can observe the viewer at all times while remaining out of direct line of sight of the viewer.

BRIEF DESCRIPTION OF THE DRAWING

Other features, objects and advantages of this invention will become apparent upon reading the following detailed description and referring to the accompanying drawings wherein:

FIG. 1 is a perspective view illustrating the visual training machine with a three-dimensional object suspended therefrom in front of a backdrop;

FIG. 2 is a perspective view illustrating a display board having a plurality of three-dimensional objects, mounted thereon only one of which is identical to a suspended object;

FIG. 3 is a perspective view illustrating an embodiment of suspendable two-dimensional objects including words, letters, and numbers, which are secured to one face of an adhesive member which in turn is fastened to a weight member; and FIG. 4 is a view illustrating two-dimensional geometric objects that can be adhesively fastened to the adhesive member of FIG. 3 in place of the illustrated two-dimensional objects.

DESCRIPTION OF THE PREFERRED EMBODIMENTS

Referring now to the drawings in more detail, FIG. 1 illustrates a visual training machine 12 including a base member 14 having a support member 16 secured thereto. As will be explained in more detail subsequently, the support member 16 is operable to suspend an object 18 in a viewer's field of view. Positioned behind the object 18 is a backdrop 20 so that the object 18 is generally positioned between the viewer and the backdrop 20.

More specifically, the base member 14 is a substantially rectangular block having sufficient thickness, weight, and flatness of the bottom surface thereof to provide stable support for the visual training machine 12. Materials from which the base member 14 can be made include wood, plastic, or metal or any equivalent.

The support member 16 includes a laterally projecting support foot disposed at the lowermost end thereof and upright section 24 that extends from the foot 22 to a laterally projecting arm 26 located at the uppermost end thereof. The support foot 22 is formed with a plurality of apertures displaced longitudinally therealong which receive mechanical fasteners 28. The mechanical fasteners 28 can be screws, bolts, rivets, nails, or the like. It should, of course, be understood that other fastening means can be used.

The upright section 24 is disposed at substantially a right angle to the support foot 22 so that when the support foot 22 is secured to the top surface of the base member 14, the upright section 24 extends substantially vertically therefrom. An angle brace 30 is connected diagonally between the support foot 22 and the upright section 24 toward the intersecting corners thereof to provide rigid support of the upright section 24. The angle brace 30 is fastened to the support member 16 by means of mechanical fasteners 32 such as rivets which extend through a flange portion of the angle brace into the support foot 22 and the upright section 24.

Similarly an angle brace 34 is fastened diagonally between the upright section 24 and the arm 26 across the angled corner therebetween. Mechanical fasteners 36 such as rivets are also utilized to fasten a flange portion of the angle brace 34 to the upright section 24 and the arm 26 at a distance from the corner.

The arm 26 which extends laterally from the upright section 24 in a substantially horizontal direction has a line receiving aperture 38 formed vertically therethrough toward the outermost end thereof. This aperture 38 operates as a pivot point or apex for all motion of the supported object 18.

It should of course be understood that the support member could be made out of other stock including for example channel stock or tubular stock.

Secured to the top surface of arm 26 toward the corner thereof is an eye bolt 40 that operates as a guide for a line 42. In addition, a plurality of catches 44a through 44c are secured to the upright section 24 at longitudinally spaced apart locations toward the lower end thereof. These catches, 44a through 44c, can be screws, hooks, or the equivalent and are of sufficient size to receive a loop 46 disposed at one end of line 42. As will be explained in more detail subsequently, the catches 44a through 44c, are utilized to set the amount of line 42 that extends downward from aperture 38 to the object 18 whereupon the frequency or period of oscillation of a swinging object can be controlled or varied by the operator.

The line 42 is preferably of a small diameter relative to the object 18 and is of a material which is not highly or overly visible. Materials that could be used are nylon, rayon, plastics, natural fibers, and include polyfilament and monofilament construction. The lowermost end of line 42 depending downward from the aperture 38 has a hook 48 secured to it such as by tying or other fastening means.

The hook 48 is preferably a swivel hook having an upper eye member and a lower eye member, each of which are rotatably mounted in a swivel block 50 so that they can rotate axially relative to one another. The lower eye member has an object hook 52 secured thereto. Of course a simple hook 48 could be used.

An object 18 is secured to the hook 50 so that it extends downward from the aperture 38 by means of line 42. The object 18 can be any one of a plurality of unique objects such as those mounted on a display board 56 illustrated in FIG. 2. Each of these objects has an eye bolt secured to one surface thereof so that they can be readily attached and detached from the hook 50. Of course a swivel hook could be secured thereto and attached to the hook 48.

A display board 56 is a substantially rectangular member having a flat display surface thereon. A plurality of hooks 58 are secured to the display surface at spaced apart locations. The hooks 58 receive the eye members 54 of each individual unique object 18, some of which can be confusingly similar, so that they can be conveniently displayed for the viewer. Preferably the background of the display surface on display board 56 contrasts with objects 18 so that they can be readily distinguished.

The display board 56 has a support member 72 mounted on the back face thereof. This support member 72 includes an uppermost lateral section 70 thereof that is fastened such as by glueing or by mechanical fasteners to the back face of the display board along a lateral area between the top edge and lower edge of the display board. A hinge point is formed in the support member substantially horizontally therealong so that the lowermost portion thereof can be pivotally folded away from the back face to operate as a support let 72 which holds the display board 56 in an upright position.

Referring back to FIG. 1, the backdrop 20 is mounted behind the base member 14 of the visual training machine 12. The backdrop 20 is substantially rectangular member having a generally planar or flat viewing surface thereon. This viewing surface can be textured or treated by conventional graphic techniques to make its appearance anywhere from complimentary of to contrasting with the suspended object 18 depending upon the degree of challenge to be offered to the viewer. For example, the viewing surface visible to the viewer can be uniform in its appearance or can have objects displayed thereon which has the same general characteristics of the suspended objects 18 or include all or any of the objects of the display board 56.

One manner in which the backdrop 20 can be mounted is by means of brackets 62 secured to the base member 14. The brackets 62 include two parallels spaced apart, vertically extending members 64 and 66 connected together at their lower end by means of a web. The interspace or channel between these members 64 and 66 receives the backdrop 20 to mount and secure it in a substantially vertical or upright position behind the suspended object 18. It should, of course, be understood that other means not interfering with motions of the objects can be used for supporting the backdrop 20 including self-supporting members on the backdrop and channeled base members.

Another embodiment of object that can be suspended are the two-dimensional objects 80 illustrated in FIG. 3. These two-dimensional object displays include a flat weighted member 74 having a hook 76 secured to the top most edge thereof. The hook 76 is preferably a swivel hook but can be a simpler hook if desired. The flat weighted member 74 can be made of lead or some other material which will lend emphasis to the periodic motion of the suspended object when displayed. Fastened to one face of the flat weighted backing member 74 is an adhesive member 78. This adhesive member 78 can be a double faced adhesive member having one face thereof secured to the face of the flat weighted backing member 74 and the other face thereof exposed for receiving and adhering to a two-dimensional unique object such as a letter, a number, of a word or any desired three-dimensional object in a viewable position.

Another type of two-dimensional object that can be secured to the adhesive face of the adhesive member 78 can include geometric shape objects 82a–82e of the type illustrated in FIG. 4. As will be explained in more detail subsequently, the viewer is to identify and correlate these geometric forms with an identical geometric form. It should be apparent that these two-dimensional objects can be readily attached and detached from the adhesive member 78 so that a variety of different objects can be suspended from the visual training machine 12, thereby varying the challenge to the viewer.

The objects used with this machine are either weighted at the same weight in themselves or are attached to a weight of approximately the same weight to allow for maximum motion and uniformity of motion.

In operation, the visual training machine 12 can be utilized to improve the visual tracking capabilities of a viewer by developing the eye muscle coordination. For example, a viewer is positioned so that his line of sight is directed at the suspended object 18 whereupon he is required to identify the object either orally, by indicating the identical object on the display board 54 of FIG. 2, or by drawing the object or otherwise identifying it on paper. Depending upon the present degree of skill of the viewer, the object can be, if desired, moved in a pendulum fashion, in a circular motion, vertically up and down, or in a spiral motion by the operator. To move the object up and down, the operator would grasp the line 42 and periodically pull and release it. If desired, the operator can secure the loop 46 to any one of the catches, 44a through 44c, whereupon the amount of line 42 depending downward from the aperture 48 is fixed. As a result, the period or frequency of non-vertical motion of the object will increase as the length of suspended line 42 decreases or will decrease as the length of line 42 increases.

The visual training machine 12 can also be utilized to assist in the developing of acuity of peripheral vision by placing the suspended object parallel to the line of sight of the viewer. The same method of identification of the objects set forth above would be used in developing acuity of peripheral vision. It should be noted that as peripheral vision improves, the angle at which the suspended object 18 is positioned relative to the line of sight and the eye can be increased until the widest possible field of vision is attained for that particular viewer.

The visual training machine 12 can also be utilized for developing visual-motor coordination or for checking it. This is accomplished by putting objects in any desired motion and having the viewer grasp the object at a predetermined point or on a given signal.

The machine can also be used to assist individuals who have three-dimensional figure ground problems which is the inability to pick out designated objects from background or surrounding objects. Thus by using the various backdrops 20, depending upon the individual's need, a viewer can be requested to identify a moving object or with a moving object as a distraction to identify certain given objects on the backdrop in much the same manner as described above. This machine has the advantage that it should be particularly helpful in a figure ground stimulus bound problem in that as an individual progresses, the degree of difference or distinction between the suspended object 18 can be decreased.

Advantages of the above described visual training machine are that the operator has control over the time of exposure to the viewer, has control over the background and has control over the type of motion. Furthermore, the distance of the object from the viewer and its angle can be readily controlled and the relationship of the eye level of the viewer to the object can be readily controlled, thereby requiring full use of the eye muscles.

The visual training machine 12 has the advantage that the structure allows the operator to position himself out of the direct line or concentrated sight of the viewer thereby removing as much unnecessary distraction as possible while still allowing for free full variety of object motion or viewer's position. For example, the operator's view of the viewer's eyes will not be significantly interferred with whether the viewer is observing the suspended object directly or peripherally. Furthermore, the operator can view head and eye motion of the viewer which is necessary for proper development of various eye functions.

While the salient features of the invention have been shown and described with respect to several embodiments, it will be readily apparent that numerous modifications may be made within the spirit and scope of the invention and it is, therefore, not desired to limit the invention to the exact details shown except insofar as they may be defined in the following claims.

I claim:

1. A visual therapy device comprising:
   a base member;

a support member secured to said base member and including an upright portion and an arm extending generally laterally therefrom, said arm having a line receiving means located away from said upright portion and being operable to receive a line and operate as a fixed pivot point therefor and to operably enable vertical motion of the downward depending portion of the line;

a line disposed through said line receiving means having an object fastener means attached toward the downward extending end thereof for securing an object thereto, said object fastener means including a swivel member whereby the inertia of said object enables it to remain substantially non-rotary during operation of the device;

line securing means attached to the upright portion of said visual thereapy device having at least one catch for securing said line, in cooperation with said line receiving means, against vertical motion and to releasably enable controllable vertical motion and length of said line;

object means having a fastener operable to be detachably secured to said object fastener means for placing said object in spacial positions toward the end of said line for viewing thereof;

background member removably mounted at one side of said base member with said object means being operable to be positioned between said background means and a viewer, the surface of said background member positioned toward said object means being operable to selectively control the amount of contrast between said object means and the background; and display board means having a plurality of fastening means on one face thereof, said fastening means being operably to mount a plurality of unique object means on said display board whereby a viewer can correlate an object means secured to said object fastener on the end of said line with a corresponding substantially identical object means operably mounted on said display board means.

\* \* \* \* \*